United States Patent
Stober et al.

(10) Patent No.: US 11,440,396 B2
(45) Date of Patent: Sep. 13, 2022

(54) HYBRID MODULE AND DRIVE ASSEMBLY FOR A MOTOR VEHICLE

(71) Applicant: Schaeffler Technologies AG & Co. KG, Herzogenaurach (DE)

(72) Inventors: Benjamin Stober, Forstfeld (FR); Dierk Reitz, Baden-Baden (DE); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 110 days.

(21) Appl. No.: 16/967,908

(22) PCT Filed: Feb. 4, 2019

(86) PCT No.: PCT/DE2019/100117
§ 371 (c)(1),
(2) Date: Aug. 6, 2020

(87) PCT Pub. No.: WO2019/158156
PCT Pub. Date: Aug. 22, 2019

(65) Prior Publication Data
US 2021/0053432 A1    Feb. 25, 2021

(30) Foreign Application Priority Data
Feb. 14, 2018   (DE) .......................... 102018103336.2

(51) Int. Cl.
*B60K 6/48*   (2007.10)
*B60K 6/387*  (2007.10)
(Continued)

(52) U.S. Cl.
CPC .............. *B60K 6/387* (2013.01); *F16D 21/06* (2013.01); *B60K 6/40* (2013.01);
(Continued)

(58) Field of Classification Search
CPC .. B60K 6/387; B60K 6/40; B60K 2006/4825; B60K 2006/266; B60K 6/44;
(Continued)

(56) References Cited

U.S. PATENT DOCUMENTS

2007/0119678 A1* 5/2007 Houle ..................... F16D 27/12
192/69.8
2008/0096717 A1   4/2008 Houle et al.
(Continued)

FOREIGN PATENT DOCUMENTS

| DE | 10248715 A1 | 5/2004 |
| DE | 102015222690 A1 | 5/2017 |

(Continued)

*Primary Examiner* — David J Hlavka

(57) ABSTRACT

A hybrid module for a motor vehicle for coupling an internal combustion engine, comprises a first drive shaft, a first electrical machine and a first coupling device, as well as a second drive shaft and, associated therewith, a second electrical machine, and a second coupling device; and further comprises an output element, the first or second drive shaft being connectable to the output element by way of a first or second coupling device, wherein the two coupling devices can be simultaneously actuated by a movement of an actuation element which is mechanically coupled to the two coupling devices. The hybrid module disclosed provides a drive device for a motor vehicle that offers energy-efficient operation in a plurality of different operating modes while requiring a small installation space.

12 Claims, 2 Drawing Sheets

(51) Int. Cl.
*F16D 21/06* (2006.01)
*B60K 6/40* (2007.10)

(52) U.S. Cl.
CPC ... *B60K 2006/4825* (2013.01); *B60Y 2200/92* (2013.01); *B60Y 2400/428* (2013.01); *B60Y 2400/60* (2013.01)

(58) Field of Classification Search
CPC . B60K 6/442; F16D 21/06; F16D 2021/0676; B60Y 2200/92; B60Y 2400/428; B60Y 2400/60
See application file for complete search history.

(56) References Cited

U.S. PATENT DOCUMENTS

| | | | | |
|---|---|---|---|---|
| 2010/0210411 | A1* | 8/2010 | Tang | B60W 20/00 903/946 |
| 2012/0006153 | A1* | 1/2012 | Imamura | B60W 20/30 74/665 A |
| 2018/0313410 | A1* | 11/2018 | Toyama | B60K 6/38 |

FOREIGN PATENT DOCUMENTS

| | | |
|---|---|---|
| DE | 102015222691 A1 | 5/2017 |
| DE | 102015222692 A1 | 5/2017 |
| DE | 102015222694 A1 | 5/2017 |
| DE | 102017127695 A1 | 5/2019 |

* cited by examiner

HYBRID MODULE AND DRIVE ASSEMBLY FOR A MOTOR VEHICLE

CROSS-REFERENCE TO RELATED APPLICATIONS

This application is the U.S. National Phase of PCT Appln. No. PCT/DE2019/100117 filed Feb. 4, 2019, which claims priority to DE 10 2018 103 336.2 filed Feb. 14, 2018, the entire disclosures of which are incorporated by reference herein.

TECHNICAL FIELD

The disclosure relates to a hybrid module for a motor vehicle for coupling a combustion engine and a drive assembly for a motor vehicle with a combustion engine and a hybrid module according to the disclosure.

BACKGROUND

Electric drives are widely known, including for driving of motor vehicles. Electric drives can be combined with combustion engines, for example integrated into hybrid modules that provide for the coupling of a combustion engine.

A hybrid module generally comprises a connecting device for mechanically coupling a combustion engine, a separating clutch with which a torque can be transmitted from the combustion engine to the hybrid module and with which the hybrid module can be uncoupled from the combustion engine, at least one electric motor for generating a drive torque with a rotor and a further clutch unit, in particular a double coupling device with which a torque can be transmitted from the electric motor and/or from the separating clutch to a drivetrain. The double coupling device consists of a first sub-clutch and a second sub-clutch. An actuating system is assigned for each clutch provided. Other starting elements such as converters or single-plate clutches instead of the double clutch are possible.

A specific electric motor enables the electric drive, the increase of power for the operation of the combustion engine and the recuperation or generation.

In addition, hybrid drives with two electric motors are known. A first electric motor is usable or connected to a combustion engine in a non-rotational manner and a second electric motor is usable or connected to the driving wheels of the motor vehicle in a non-rotational manner. Between the two electric motors a clutch device is arranged which can close and open the torque transmission path between the two electric motors. Accordingly, the two electric motors are mechanically coupled in series. The speeds and torques of the electric motors and the connected combustion engine as well as the input side of a gearbox or the drive wheels are adapted to each other by means of appropriate transmissions, such as transmission ratios of the gearwheel.

Such different operating states can be realized, for example, as a purely electric motor drive in which the clutch is open; as an electric motor drive of the motor vehicle by the first electric motor with simultaneous generator operation by the second electric motor driven by the combustion engine, the clutch being open; and as a drive with a combustion engine in which none, one or both electric motors can draw or receive power, wherein the clutch is closed.

However, these systems have the disadvantage of reduced efficiency, because when one electric motor is used as the drive, the second electric motor must also be set in rotation due to the series connection of the electric motors, whereby in addition to the magnetic forces that occur, inertial mass factors must also be overcome.

In addition, drive systems or hybrid modules are known which each have two electric motors, such that each electric motor is assigned a clutch device with which the electric motor can be coupled to or disconnected from the drivetrain. Such hybrid modules or drive systems can be retrieved from the documents DE 10 2015 222 690 A1, DE 10 2015 222 691 A1, DE 10 2015 222 692 A1 and DE 10 2015 222 694 A1.

SUMMARY

On this basis, the present disclosure is based on the task of providing a hybrid module which has a high degree of efficiency with a small installation space requirement.

Advantageous embodiments of the hybrid module are provided in the claims and explained more fully below.

The features of the claims may be combined in any technically useful way, including the explanations given in the following description and features of the figures which comprise additional embodiments of the disclosure.

In connection with the present disclosure, the term axial always refers to the axis of rotation of the hybrid module.

The disclosure relates to a hybrid module for a motor vehicle for coupling a combustion engine, comprising a first drive shaft and coupled thereto a first electric motor and a first clutch device. In addition, the hybrid module comprises a second drive shaft and a second electric motor as well as a second clutch device. The hybrid module also has an output element. A corresponding drive shaft can be or is connected to the output element through a corresponding clutch device. The disclosure provides that the two clutch devices can be actuated simultaneously by a movement of an actuating element which is mechanically coupled to both clutch devices.

The output element is preferably an output shaft for transmitting the applied torques to a gearbox or to drive wheels of a motor vehicle. Preferably the two clutch devices are designed exclusively for mutual closing.

The clutch devices enable the torque to be transmitted from the combustion engine to the first electric motor and/or from the combustion engine to the second electric motor.

The advantage of the hybrid module according to the disclosure is in particular that only one actuating device is required to actuate the two clutch devices, which is capable of closing one of the clutch devices with an axial movement of the actuating element and thereby opening the other clutch device.

This is a simple way to implement a required concept, where one of the two electric motors does not serve as a drive in combustion engine mode and does not run in generator mode. Correspondingly, no energy required for the rotation of this electric motor or its rotor. In other words, the present disclosure ensures that an electric motor which would otherwise be idle can be switched off.

In an embodiment of the hybrid module according to the disclosure, it is provided that the rotor of the first electric motor is connected to the first drive shaft and the rotor of the second electric motor is connected to the output element so that it cannot rotate.

This means that the first drive shaft is firmly coupled to the rotor of the first electric motor and is connected to the first clutch device. The second electric motor is directly assigned to the output element or the output shaft.

Another advantageous embodiment of the hybrid module is that the first clutch device and the second clutch device are both components of a double coupling device which has an outer plate carrier common to both clutch devices. In the design of the double coupling device with common outer plate carriers, components of the two clutch devices, which are coupled to the first drive shaft and the output element, are inner plate carriers. The disclosure is not limited to the above-mentioned connection of the driving or driven side with the inner plate carriers and the outer plate carriers, but the inner plate carriers and the outer plate carriers can also be assigned to the other side. This means that the double coupling device is designed in such a way that only one of the two clutch devices is closed at a time, while the other clutch device is open in this closed state. The operation of one of the two clutch devices automatically results in the operation of the other clutch device, so that mutual operation is ensured.

In a preferred embodiment of the hybrid module, the two clutch devices have a connecting element which is mechanically connected to the actuating element and/or which at least partially forms the actuating element, and to which pressure plates of the first clutch device and the second clutch device can or are connectable in an axially fixed manner, so that an axial displacement or axial release of the first pressure plate simultaneously leads to an axial displacement or axial release of the second pressure plate, so that simultaneous actuation of the clutch devices with opposite function can be achieved. The opposite functions are respectively opening and closing of the respective clutch devices. The advantage of this embodiment is that only one actuating device or actuator is required to actuate the two clutch devices, which preferably acts with an axial force on the actuating element or on the connecting element.

As an integral part, the hybrid module may have an actuating device designed to operate both the first and second clutch devices simultaneously.

Preferably the actuating device is arranged and set up in such a way that an actuating force can be applied to the actuating element to move it. In particular, the actuating device and the actuating element can be designed in such a way that direct power transmission is possible.

In another advantageous embodiment of the hybrid module according to the disclosure, it is provided that at least one of the clutch devices has a spring device, in particular a diaphragm spring, the spring force of which, when the spring device is tensioned, supports and/or causes one of the two clutch devices to close and supports and/or causes the other clutch device to open.

In this case both the first clutch device may have a first spring device and the second clutch device may have a second spring device, the first spring device and the second spring device supporting and/or causing the closing of the first clutch device and supporting and/or causing the opening of the second clutch device. Preferably, the first spring force generated by the first spring device shall be significantly less than the force required by the actuating device to fully close the second clutch device. This has the advantage that an actuating force with a small range of variation must be applied by the entire actuating device, i.e. to actuate both clutch devices in both directions. The control effort is correspondingly low and the actuating device can be implemented with correspondingly simple means.

In a further advantageous embodiment of the hybrid module, it is provided that the second clutch device has a second inner plate carrier which is coupled to the output element in a rotationally fixed and axially displaceable manner, wherein the hybrid module further has a compression spring device, in particular a coil spring, which is supported axially on the output element and presses against the second inner plate carrier, which in turn is supported axially on a coupling carrier common to the first clutch device and the second clutch device. This common coupling carrier in turn can be supported axially directly or indirectly on the first drive shaft. Preferably, there is one rotary bearing each axially between the inner plate carrier and the coupling carrier and between the coupling carrier and the first drive shaft, which serves to transmit the axial force applied by the compression spring device.

A further aspect of the present disclosure is a drive assembly for a motor vehicle with a combustion engine according to the disclosure and a hybrid module and with a transmission, wherein the hybrid module is mechanically connected to the combustion engine and the transmission through clutch devices of the hybrid module.

BRIEF DESCRIPTION OF THE DRAWINGS

The disclosure described above is explained in detail below based on the relevant technical background with reference to the associated drawings, which show advantageous embodiments. The disclosure is in no way restricted by the mere schematic drawings, although it should be noted that the embodiments shown in the drawings are not limited to the dimensions shown. It is shown in FIG. 1: A section of a hybrid module according to the disclosure.

DETAILED DESCRIPTION

Figure 1:
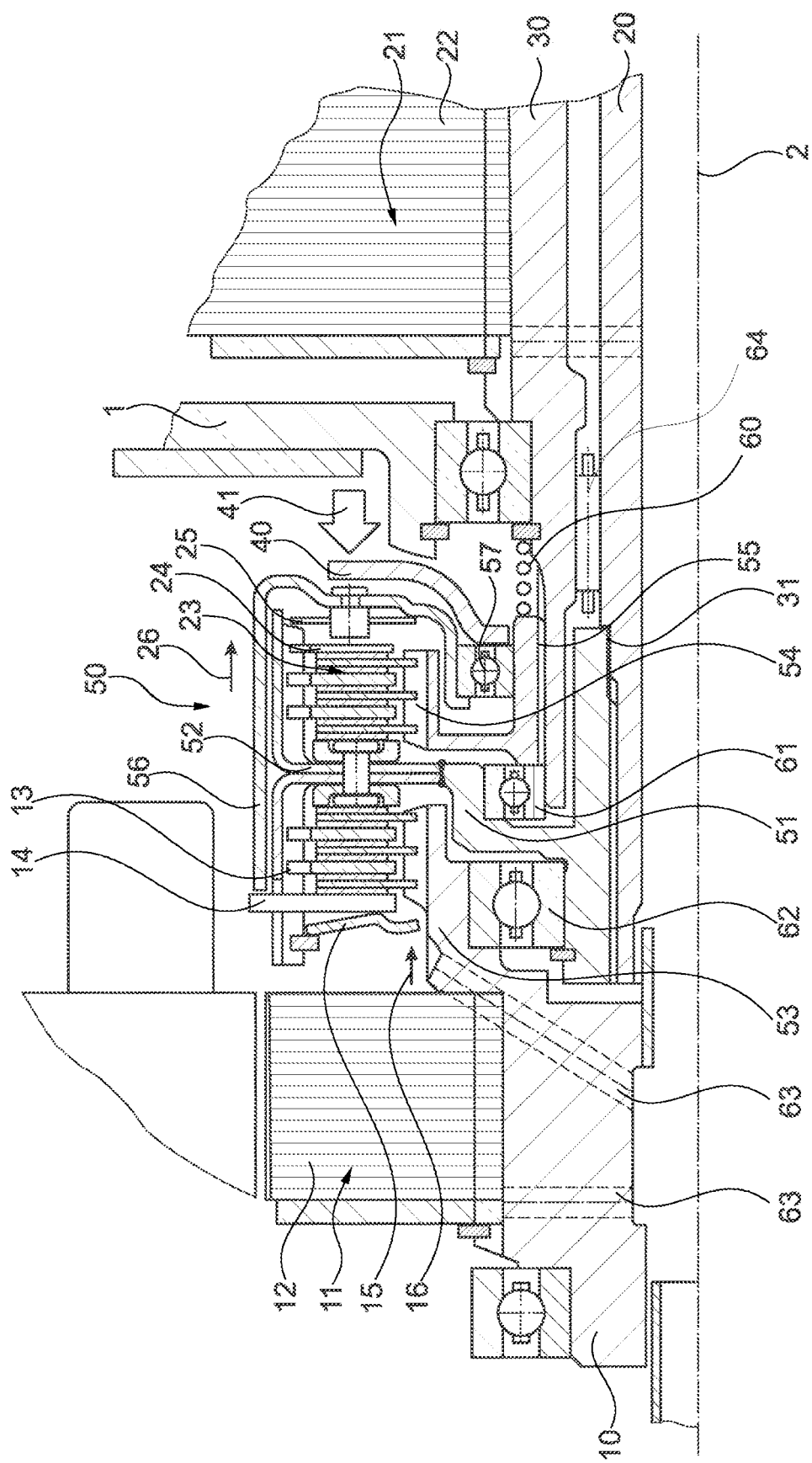

The hybrid module according to the disclosure shown in FIG. 1 comprises in a housing 1, which is only indicated here, on a common axis of rotation 2 a first drive shaft 10, on which the rotor 12 of a first electric machine 11 is non-rotatably mounted.

The rotor 22 of a second electric motor 21 is mounted non-rotatably on an output element 30 in the form of an output shaft. The first drive shaft 10 and the output element 30 are arranged rotationally symmetric to each other. A second drive shaft 20 is to be connected mechanically, possibly through a separating clutch, to a combustion engine, which may also be part of the hybrid module.

The first drive shaft 10 is connected to a common coupling carrier 51 through a first clutch device 13. The output element 30 is also connected to the common coupling carrier 51 through a second clutch device 23. This common coupling carrier 51 is connected non-rotatably to the second drive shaft 20 through a tooth system 31.

In the configuration shown here, the first clutch device 13 and the second clutch device 23 together form a double coupling device 50. This double coupling device 50 consists of one of the outer plate carriers 52 which is common to the two clutch devices 13,23 and which is non-rotatably connected, here welded, to the common coupling carrier 51.

The first drive shaft 10 itself forms a first inner plate carrier 53, on which inner plates of the first clutch device 13 are arranged, alternating with outer plates of the first clutch device 13 arranged axially displaceably on the outer plate carrier 52.

Likewise, a second inner plate carrier 54, which is coupled to the output element 30 through a torsionally rigid connection 55, carries inner plates of the second clutch device 23, which are arranged alternately with outer plates of the second clutch device 23. The outer plates of the second clutch device 23 are arranged axially displaceable on the outer plate carrier 52.

A first pressure plate (14) of the first clutch device (13) is coupled in an axial fixed manner at a stop point with a connecting element (56), also called a thrust piece, to a second pressure plate of the second clutch device (23). In this way both pressure plates 14,24 can only ever be axially displaced together, so that when one clutch device 13,23 is actuated in one mode, the other clutch device 13,23 is automatically actuated in the opposite mode. This means that when the first clutch device 13 is closed, the second clutch device 23 is automatically opened and vice versa. This ensures that when the second electric motor 21 is operated, the first electric motor 11 is decoupled from the output element 30 or the output shaft and thus no energy is required to realize a rotary motion of the first rotor and to overcome the magnetic forces occurring there. The present hybrid module according to the disclosure is not limited to this embodiment, but it can also be provided that each clutch device 13,23 is assigned its own actuating device, such that even then these additional actuating devices should be designed and arranged in such a way that the two clutch devices 13,23 can be actuated simultaneously with opposite operating modes.

To actuate the double coupling device 50 shown here, an actuating device not shown separately is provided, which is preferably supported on housing 1. In particular, the actuating device may be a hydraulic system or an electromechanical system. The actuating force 41 in the axial direction applied by the actuating device is shown in FIG. 1. It acts on an actuating element 40, which is mounted axially on a pivot bearing 57.

The pivot bearing 57 is again supported axially on the connecting element 56, which can be or is connected in an axial fixed manner to the pressure plates 14,24 of the two clutch devices 13.23. In this way, simultaneous operation of the two clutch devices 13,23 can be achieved by applying the actuating force 41.

In the version shown here, the first clutch device 13 is assigned a first spring device 15 in the form of a first diaphragm spring and the second clutch device 23 is assigned a second spring device 25 in the form of a second diaphragm spring. The first spring device 15 causes a first spring force 16 in the same direction as the second spring force 26 caused by the second spring device 25.

This means that both spring devices 15,25 act in the direction of closing the first clutch device 13 and opening the second clutch device 23. In the embodiment shown here it is provided that essentially the first spring device 15 causes the opening of the second clutch device 23 over a first partial path and the second spring device 25 causes the opening of the second clutch device 23 over a second partial path.

The second spring device 25 also ensures that the connecting element 56 does not lift off the pivot bearing 57.

In addition, the hybrid module shown here contains a compression spring device 60 in the form of a coil spring, which is supported axially indirectly on housing 1. On the axially opposite side, the compression spring device 60 presses against the second inner plate carrier 54, which in turn is axially supported on a first rotary bearing 61. This first rotary bearing 61 is itself axially supported on the common coupling carrier 51, which in turn is axially supported on the first drive shaft 10 through a second rotary bearing 62. This makes it easy to reduce any existing tolerances in the hybrid module or in the individual components and to reduce them by applying constant pressure in the axial direction. In addition, the bearings involved, namely the pivot bearing 57 as well as the first rotary bearing 61 and the second rotary bearing 62, are axially preloaded so that they have little or no axial play.

To lubricate the double coupling device 50, 10 bores 63 are integrated in the first drive shaft to allow the transport of lubricants which can also be used for cooling.

A relative rotational movement between the second drive shaft 20 and the coaxially arranged output element 30 is ensured by a needle bearing 64. The clutch devices 13,23 shown are not limited to multi-disk clutches, but other frictionally engaged or positive-locking couplings can also be used.

Figure 2:
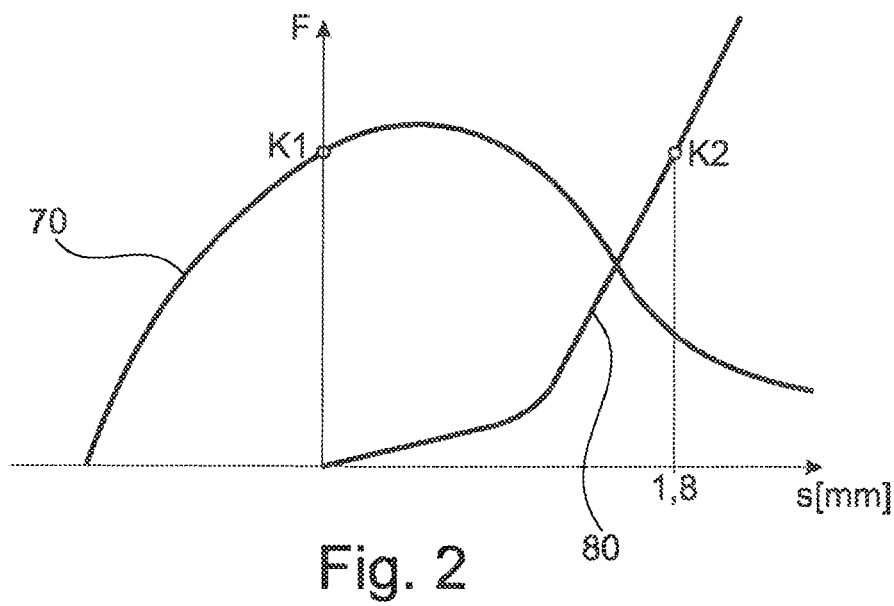
FIG. 2: A force-path diagram showing the characteristics of the first spring device and the actuating device.
Figure 3:
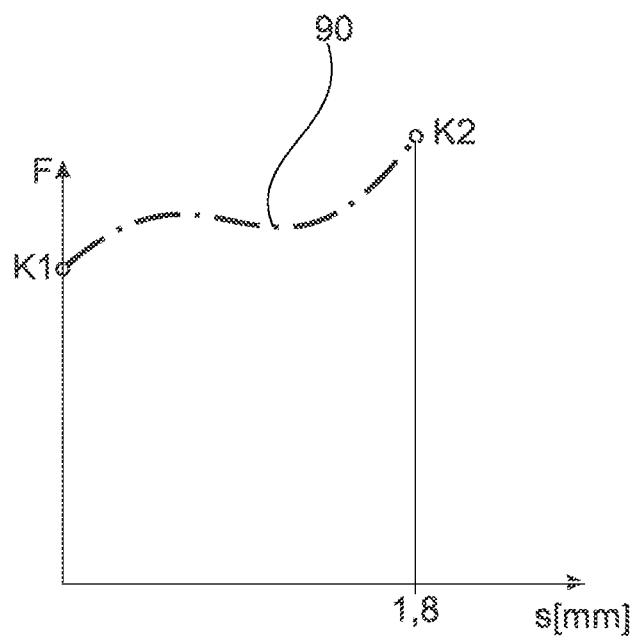
FIG. 3: A force-path diagram with a summed up characteristic curve.

The diagrams in FIGS. 2 and 3 show typical curves of the force/stroke characteristic of a spring device and the coupled actuating device.

FIG. 2 shows the characteristic curve 70 of the first cup spring, which is provided here as the first spring device 15. The diagram shows the operating point K1 at which the first clutch device 13 is fully closed. When the first clutch device 13 is actuated by axial displacement of the first pressure plate 14 along the direction of the actuating force 41 over a positive distance s, as shown in the diagram in FIG. 2, the force F applied by the first spring device 15 or the first diaphragm spring changes. It can be seen that, after a brief increase in force F, it decreases significantly as the distance s increases further.

FIG. 2 also shows characteristic 80 of the actuating device. It can be seen that after an initially small force F, which is required to cover a relatively long distance s, a kink occurs in feature 80 and then feature 80 shows a steeper rise. This is due to the fact that when the second clutch device 23 is closed, after the plates of the second clutch device 23 have first been pushed together and the plates are in contact, they have to be pressed together with increased force F in order to achieve a further actuating travel and to transmit a correspondingly high axial contact force, which ensures the transmission of a high friction torque.

The extent of the rise of the characteristic 80 is influenced by the component stiffnesses of the components involved as well as by the deflection of the linings of the carriers and the acting second spring device 25.

Here the point K2 is still visible, which illustrates the point where the second clutch device 23 is completely closed. For the embodiment shown here, this distance s is 1.8 mm, which is dependent not only on the distances to be bridged by the plates but also on the tolerances of the clutch devices 13.23.

It can be seen that for the distance s traveled to close the second clutch device 23, the force F applied by the first spring device 15 or the first diaphragm spring is already relatively small. However, this relatively small force F is sufficient to allow an automatic return to the initial position when the actuating force 41 generated by the actuating device decreases, thus overcoming the friction in the system.

In addition, the hybrid module according to the disclosure can be equipped with a device for slip detection, with which the clutch devices 13,23 can be automatically controlled if necessary and with which the contact pressure forces prevailing in the clutch devices 13,23 can be adjusted.

FIG. 3 shows the calculated result of an addition of the two characteristic curves 70, 80 explained in FIG. 2, such that it can be seen that the forces F required to realize the two characteristic points K1 and K2 differ only slightly from each other. It is also evident that the cumulative characteristic 90 in FIG. 2 shows only slight fluctuations between the two points K1 and K2. This makes it clear that an actuating device to be provided must essentially be designed for a relatively small force range in order to be implemented.

The hybrid module proposed here represents a propulsion system for a motor vehicle that enables energy-efficient operation in several different modes of operation in a small installation space.

LIST OF REFERENCE NUMBERS

1 Housing
2 Axis of rotation
10 First drive shaft
11 First electric motor
12 Rotor of the first electric motor
13 First clutch device
14 First pressure plate
15 First spring device
16 First spring force
20 Second drive shaft
21 Second electric motor
22 Rotor of the second electric motor
23 Second clutch device
24 Second pressure plate
25 Second spring device
26 Second spring force
30 Output element
31 Tooth system
40 Actuating element
41 Actuating force
50 Double coupling device
51 Common clutch carrier
52 Outer plate carrier
53 First inner plate carrier
54 Second inner plate carrier
55 rotationally fixed connection
56 Connecting element
57 Pivot bearing
60 Pressure spring device
61 First rotary bearing
62 Second rotary bearing
63 Bore for lubricant
64 Needle bearing
70 Characteristic of the first plate spring
80 Characteristic of the actuating device
90 Overall characteristic of the first plate spring and the actuating device

The invention claimed is:

1. A hybrid module for a motor vehicle for coupling a combustion engine, comprising: a first drive shaft, a first electric motor and a first clutch device, and having a second drive shaft and a second electric motor and a second clutch device; and further having an output element, wherein the respective first or second drive shaft is configured to be selectively connected to the output element through the respective first or second clutch device, wherein the first and second clutch devices are configured to be actuated simultaneously by a movement of an actuating element mechanically coupled to both clutch devices, and wherein a rotor of the first electric motor is connected in a rotationally fixed manner to the first drive shaft and a rotor of the second electric motor is connected in a rotationally fixed manner to the output element.

2. The hybrid module according to claim 1, wherein the first clutch device and the second clutch device are both components of a double coupling device, which has an outer plate carrier common to the first and second clutch devices.

3. The hybrid module according to claim 1, wherein the first and second clutch devices have a connecting element which is mechanically coupled to the actuating element and/or which at least partially forms the actuating element, and to which first and second pressure plates of the first clutch device and the second clutch device are connected in an axial fixed manner, so that an axial displacement of the first pressure plate simultaneously leads to the axial displacement of the second pressure plate, so that simultaneous actuation of the first and second clutch devices with opposite function can be realized.

4. The hybrid module according to claim 3, further comprises an actuating device configured to actuate both the first clutch device and the second clutch device simultaneously.

5. The hybrid module according to claim 4, wherein the actuating device is arranged and configured such that an actuating force can be applied with it to the actuating element for displacement thereof.

6. The hybrid module according to claim 1, wherein at least one of the first or second clutch devices has a spring device with a spring force, when the spring device is tensioned, that supports and/or effects closing of one of the first or second clutch devices and supports and/or effects opening of the respective other clutch device.

7. The hybrid module according to claim 6, wherein both the first clutch device has a first spring device and the second clutch device has a second spring device, the first spring device and the second spring device supporting and/or causing the closing of the first clutch device and supporting and/or causing the opening of the second clutch device.

8. The hybrid module according to claim 1, wherein the second clutch device has a second inner plate carrier which is connected to the output element in a rotationally fixed and axially displaceable manner, the hybrid module further having a compression spring device, which is supported axially on the output element and presses against the second inner plate carrier, which in turn is supported axially on a coupling carrier common to the first clutch device and the second clutch device.

9. A drive assembly for a motor vehicle with a combustion engine and the hybrid module according to claim 1 and with a transmission, the hybrid module being mechanically connected to the combustion engine and the transmission through the first and second clutch devices of the hybrid module.

10. The hybrid module according to claim 6, wherein the spring device is a diaphragm spring.

11. The hybrid module according to claim 8, wherein the compression spring device is a coil spring.

12. A hybrid module for a motor vehicle, comprising:
a first and a second drive shaft;
an output element;
a first electric motor mounted on the first drive shaft;
a second electric motor mounted on the output element;
a carrier non-rotatably connected to the second drive shaft, wherein the carrier is configured to be coupled to the first drive shaft via a first clutch device and to the output element via a second clutch device; and
an actuating element configured to actuate the first clutch device and the second clutch device simultaneously.

* * * * *